(12) United States Patent
Gerard et al.

(10) Patent No.: US 9,777,140 B2
(45) Date of Patent: Oct. 3, 2017

(54) COMPOSITE MATERIAL VIA IN-SITU POLYMERIZATION OF THERMOPLASTIC (METH)ACRYLIC RESINS AND ITS USE

(71) Applicant: Arkema France, Colombes (FR)

(72) Inventors: Pierre Gerard, Denguin (FR); Michel Glotin, Saint-Cloud (FR); Gilles Hochstetter, Bernay (FR)

(73) Assignee: Arkema France, Colombes (FR)

( * ) Notice: Subject to any disclaimer, the term of this patent is extended or adjusted under 35 U.S.C. 154(b) by 0 days.

(21) Appl. No.: 14/352,090

(22) PCT Filed: Oct. 19, 2012

(86) PCT No.: PCT/EP2012/004381
§ 371 (c)(1),
(2) Date: Apr. 16, 2014

(87) PCT Pub. No.: WO2013/056845
PCT Pub. Date: Apr. 25, 2013

(65) Prior Publication Data
US 2014/0256850 A1    Sep. 11, 2014

(30) Foreign Application Priority Data

Oct. 21, 2011 (FR) .................................. 11 59553

(51) Int. Cl.
*C08J 5/24* (2006.01)
*C08K 7/14* (2006.01)
*C08F 265/06* (2006.01)
*C08L 33/12* (2006.01)
*C08F 220/14* (2006.01)
*B29C 70/44* (2006.01)
*C08K 7/06* (2006.01)
*B29K 33/00* (2006.01)

(52) U.S. Cl.
CPC ................ *C08K 7/14* (2013.01); *B29C 70/44* (2013.01); *C08F 220/14* (2013.01); *C08F 265/06* (2013.01); *C08J 5/24* (2013.01); *C08K 7/06* (2013.01); *C08L 33/12* (2013.01); *B29K 2033/12* (2013.01); *C08J 2333/12* (2013.01)

(58) Field of Classification Search
CPC ........................................................ C08J 5/24
USPC ............................................................ 523/222
See application file for complete search history.

(56) References Cited

U.S. PATENT DOCUMENTS

| | | | |
|---|---|---|---|
| 3,287,155 A | 11/1966 | Munn | |
| 3,380,980 A | 4/1968 | Calkins et al. | |
| 6,203,911 B1 * | 3/2001 | Weberg et al. | 428/413 |
| 6,288,190 B1 | 9/2001 | Kerscher et al. | |
| 6,448,354 B1 | 9/2002 | Hieda et al. | |
| 7,723,408 B2 | 5/2010 | Gerhardt et al. | |
| 2002/0115748 A1 | 8/2002 | Lee et al. | |
| 2009/0169867 A1 | 7/2009 | Kelly | |

FOREIGN PATENT DOCUMENTS

| | | |
|---|---|---|
| CN | 1548168 | 11/2004 |
| EP | 0097012 | 12/1983 |
| EP | 0134973 | 3/1985 |
| JP | 9085841 | 3/1997 |
| WO | WO 2011/148619 | 1/2011 |

* cited by examiner

*Primary Examiner* — Edward Cain
(74) *Attorney, Agent, or Firm* — Thomas F. Roland

(57) ABSTRACT

The present invention relates to a composite material obtained by in situ polymerization of a thermoplastic resin with a fibrous material. More particularly the present invention relates to a polymeric composite material obtained by in-situ polymerization of a thermoplastic (meth) acrylic resin and a fibrous material containing long fibers and its use, a process for making such a composite material and manufactured mechanical or structured part or article comprising this polymeric composite material.

21 Claims, 1 Drawing Sheet

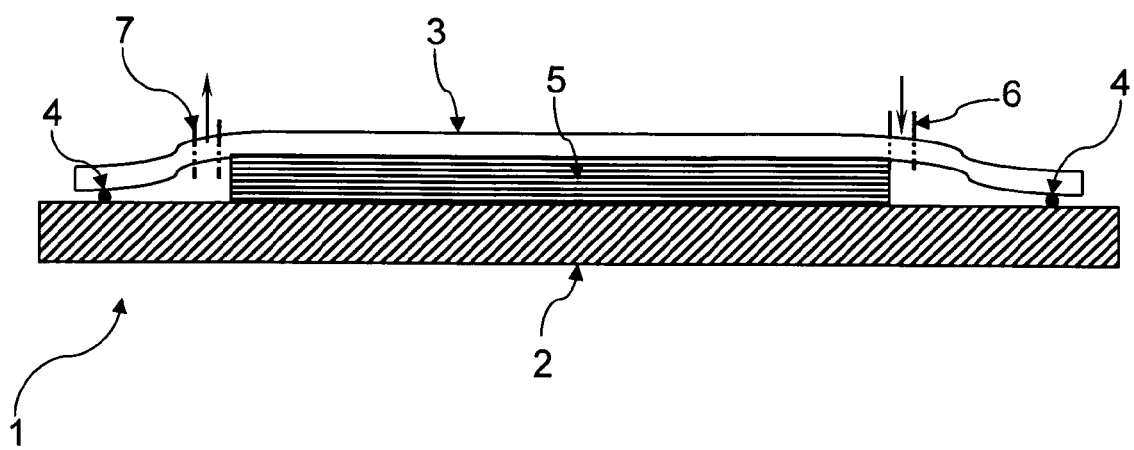

COMPOSITE MATERIAL VIA IN-SITU POLYMERIZATION OF THERMOPLASTIC (METH)ACRYLIC RESINS AND ITS USE

This application claims benefit, under U.S.C. §119 or §365 of PCT Application Number PCT/EP2012/004381, filed Oct. 19, 2012, and French Patent Application Number FR 11.59553, filed Oct. 21, 2011.

FIELD OF THE INVENTION

The present invention relates to a composite material obtained by in situ polymerization of a thermoplastic resin with a fibrous material.

More particularly the present invention relates to a polymeric composite material obtained by in-situ polymerization of a thermoplastic (meth)acrylic resin and a fibrous material containing long fibers and its use, a process for making such a composite material and manufactured mechanical or structured part or article comprising this polymeric composite material.

Technical Problem

A composite material is a macroscopic combination of two ore more non miscible materials. The composite material constitutes at least of a matrix material that forms a continuous phase for the cohesion of the structure and a reinforcing material with various architectures for the mechanical properties.

The aim in using composite materials is to achieve a performance from the composite material that is not available from its separate constituents if used alone. Consequently composite materials are widely used in several industrial sectors as for example building, automotive, aerospace, transport, leisure, electronics, and sport notably due to their better mechanical performance (higher tensile strength, higher tensile modulus, higher fracture toughness) in comparison with homogenous materials and their low density.

The most important class in view of volume in commercial industrial scale, are composites with organic matrices, where the matrix material is a generally polymer. The principal matrix or continuous phase of a polymeric composite material is either a thermoplastic polymer or a thermosetting polymer.

Thermosetting polymers consist of crosslinked three dimensional structures. The crosslinking is obtained by curing reactive groups inside the so called prepolymer. Curing for example can be obtained by heating the polymer chains in order to crosslink and harden the material permanently. In order to prepare the polymeric composite material the prepolymer is mixed with the other component (for example glass beads for a particulate composite or short fibers for a fibrous composite) or the other component is wetted or impregnated (for example woven nets) and cured afterwards. Example for prepolymers or matrix material for thermoset polymers are unsaturated polyesters, vinylesters, epoxy or phenolic ones.

The disadvantage of a thermoset polymer matrix is its rigidity. The matrix cannot be easily shaped in other forms. Once the polymer has been cured the form is fixed. This makes also difficult the recycling of the thermoset composite material, which are burned in a cement plant or thrown into a waste dump.

Thermoplastic polymers consist of linear or branched polymers, that are not crosslinked. The thermoplastic polymers are heated in order to mix the two constituents necessary for producing the composite material and to be cooled for setting. The limit in using thermoplastic polymers for the fabrication of composite materials is their high viscosity in the molten state. The wetting or correct impregnation of the fibers by the thermoplastic polymer can only be achieved, if the thermoplastic resin is sufficiently fluid. In order to have a low viscosity or sufficient fluidity of the thermoplastic polymer the chain length (molecular mass) can be reduced. However a too low molecular weight has a negative impact on the performance of the composite material especially the mechanical properties. On the other hand the temperature of the thermoplastic polymer could be increased in order to reduce the viscosity in an important way. Consequently the continuous working temperature is relatively high, above 200° C., influencing directly the economics (costs) of the composite material due to implication of high energy costs. Additionally thermoplastic polymers tend to degrade if the temperature is very high, which is especially true for semi-crystalline thermoplastic polymers that have high melting points as for example polyamides (for example PA6.6), polyethersulfon (PES), polyetherimide (PEI), polyetheretherketon (PEEK) or polyphenylene sulfide (PPS). This thermo induced degradation yields to a decreasing molecular weight of the polymer matrix important for the cohesion of the composite material.

Another way for impregnating the fibrous substrate is to dissolve the thermoplastic polymer in an organic solvent. However this method requires a lot of solvent that has to be evaporated. There are environmental issues in using large quantities of solvent in term of energy and pollution.

These are the limits or disadvantages for the preparation of thermoplastic composite especially with continuous reinforcements. There is a need of a thermoplastic composite, that can be made by a process as a thermoset composite in terms of low initial viscosity in order to impregnate the fibrous material and also having low production cycle times, with a complex geometry and in series production.

The objective of the present invention is to solve the disadvantages mentioned above.

The objective of the present invention is to have a polymeric composite material with satisfying mechanical properties that can be prepared easily, be transformed and shaped into form, where the polymeric matrix has a high molecular weight.

Another objective of the present invention is to have a polymeric composite material with continuous fibers as reinforcements where pieces with a large size can be produced fast and easily (short cycle times) and the polymeric matrix can be easily recycled and repaired.

Still another objective of the present invention is to have a process, where the fibrous material is correctly and completely wetted, where polymeric composite material with continuous fibers can be produced fast, for obtaining objects of large size and/or complex forms.

An additional objective of the present invention is to have a structural part comprising a thermoplastic composite material with satisfying mechanical properties such as high stiffness and a modulus of at least 15 GPa.

Still an additional objective of the present invention is to wet completely, correctly and in a homogenous way the fibrous substrate during impregnation. Any defects of fiber wetting for example by bubbles and voids decrease the mechanical performance of the composite material.

Another objective of the present invention is the recycling of the composite material that do not meet quality standards or worn-out structural parts. Under recycling is understood to recover at least a part of the used raw materials. This means grinding and reusing the thermoplastic polymer. This means also for example that the monomer from the thermoplastic matrix of the composite material can be recovered.

BACKGROUND OF THE INVENTION

Prior Art

The document US2009/0169867 describes a composite material and methods of making the same. The polymer matrix is obtained by curing or drying a aqueous binder composition comprising polymer particles of an emulsion polymerization of ethylenically unsatured monomers including (meth)acrylic ester monomers. The substrate material of the composite may be chosen from fibers.

The document U.S. Pat. No. 7,723,408 describes a composite material, wherein the matrix material is preferably a thermoplastic polymer including PMMA. Filler material includes metal coated glass fibers. The matrix and the filler material are mixed, either by dry mixing or by solution mixing.

The document EP0134973 describes fiber mat reinforced polyarylene sulfide composites and their method of preparation. The fibers are brought into contact with the thermoplastic polymer either by heating under pressure the two components or the fiber mat is impregnated with slurry of poly phenylene sulfide in a carrier liquid followed by a drying step in order to remove the liquid followed as well by a heating step.

The document US 2002/0115748 describes a glass fiber reinforced styrenic thermoplastic composite containing an aminosilane coupling agent. A styrene-copolymer is mixed with the coupling agent and glass fibers in order to improve the surface adhesion between the matrix resin and the glass fibers. This method requires a third component which has to be compatible on one hand with the fibrous material and on the other hand with the polymer matrix.

The document CN1548168 describes a continuous carbon fiber reinforced composite material for bone repair. The fibers are impregnated with methyl methacrylate (MMA) or oligomers by pultrusion process or body casting. Flexible long chain acrylic monomers are added to the MMA at at least 5 wt % in order to overcome the brittleness of the material.

The document FR1374046 describes a process for the polymerisation of acrylic monomers; more particularly cured products from a (meth) acrylic monomer-polymer syrup in presence of tin chloride and organic peroxides.

The prior art shows that PMMA is mentioned as thermoplastic polymer matrix for fibrous composites or that the acrylic monomers or functionalities are used for crosslinking thermoset matrices. No thermoplastic fibrous composite material based on a methacrylic matrix according to the present invention is described.

No thermoplastic composite material is described where the fibrous material and the thermoplastic (meth)acrylic matrix are brought into contact before the final polymerization step according to the present invention.

BRIEF DESCRIPTION OF THE INVENTION

Surprisingly it has been discovered that a composite material comprising
(a) a polymeric thermoplastic (meth)acrylic matrix and
(b) a fibrous material as reinforcement
wherein the fibrous material has either at least an aspect ratio of the fibre of at least 1000 or at least a two dimensional macroscopic structure, has satisfying mechanical properties.

Surprisingly it has also been discovered that a composite material comprising
(a) a polymeric thermoplastic (meth)acrylic matrix and
(b) a fibrous material as reinforcement
wherein the fibrous material has either at least an aspect ratio of the fibre of at least 1000 or at least a two dimensional macroscopic structure can be easily prepared by a process wherein the fibrous material and the polymeric thermoplastic (meth)acrylic matrix were brought into contact by a wetting step of the fibrous material with a liquid syrup comprising the monomers for forming the polymeric thermoplastic (meth)acrylic before the polymerization wherein the dynamic viscosity at 25° C. of the liquid syrup is between 10 mPa*s and 10000 mPa*s, preferably between 50 mPa*s and 5000 mPa*s and advantageously between 100 mPa*s and 1000 mPa*s.

It has also been found that a process for preparing a polymeric composite material comprising
(a) a polymeric thermoplastic (meth)acrylic matrix and
(b) a fibrous material as reinforcement
that comprises a wetting step of the fibrous material with a liquid syrup comprising the monomers for forming the polymeric thermoplastic (meth)acrylic before the polymerization yield to composites with the satisfying mechanical properties and the other required characteristics for a composite material.

DETAILED DESCRIPTION OF THE INVENTION

In a first aspect, the present invention relates to a composite material comprising
(a) a polymeric thermoplastic (meth)acrylic matrix and
(b) a fibrous material as reinforcement
wherein the fibrous material has either at least an aspect ratio of the fibre of at least 1000 or at least a two dimensional macroscopic structure.

In a second aspect the present invention relates to a composite material comprising
(a) a polymeric thermoplastic (meth)acrylic matrix and
(b) a fibrous material as reinforcement
wherein polymeric thermoplastic (meth)acrylic matrix is chosen from homopolymer or a copolymer of methyl methacrylate or mixtures thereof.

In a third aspect the present invention relates to a process for preparing a polymeric composite material comprising
(a) a polymeric thermoplastic (meth)acrylic matrix and
(b) a fibrous material as reinforcement
that comprises a wetting step of the fibrous material by a liquid syrup comprising the monomers for forming the polymeric thermoplastic (meth)acrylic before the polymerization.

In a fourth aspect the present invention relates to the use of a composite material comprising
(a) a polymeric thermoplastic (meth)acrylic matrix and
(b) a fibrous material as reinforcement
wherein the fibrous material has either at least an aspect ratio of the fibre of at least 1000 or at least a two dimensional macroscopic structure in the field of automotive applications, marine applications, railroad applications, sport, aeronautic applications, photovoltaic applications and wind energy applications.

In a fifth aspect the present invention relates to a manufactured mechanical or structured part or article comprising such a polymeric composite material.

By the term "(meth)acrylic" as used is denoted all kind of acrylic and methacrylic monomers.

By the term "PMMA" as used are denoted homo- and copolymers of methylmethacrylate (MMA), for the copolymer of MMA the weight ratio of MMA inside the PMMA is at least 70 wt %.

By the term "thermoplastic polymer" as used is denoted a polymer that turns to a liquid or becomes more liquid or less viscous when heated and that can take on new shapes by the application of heat and pressure.

By the term "thermosetting polymer" as used is denoted a prepolymer in a soft, solid or viscous state that changes irreversibly into an infusible, insoluble polymer network by curing.

By the term "polymer composite" as used is denoted a multicomponent material comprising multiple different phase domains in which at least one type of phase domain is a continuous phase and in which at least one component is a polymer.

By the term "impregnation" as used is denoted the penetration of monomeric, oligomeric or polymeric liquids or mixtures thereof into an assembly of fibers.

By the term "prepreg" as used are denoted sheets of a substrate that have been impregnated with a curable prepolymer, or liquid reactants or a thermoplastic and are ready for the fabrication of laminates.

By the term "wetting" as used is denoted a process by which the interface between a solid and a gas is replaced by an interface between the same solid and a liquid.

By the term "high molecular weight" as used in the present invention is denoted a weight average molecular weight Mw>50000 g/mol as measured by GPC.

By the term "aspect ratio" for a fiber as used in the present invention is denoted the ratio between the length and the diameter of the fiber.

By the term "two dimensional structure" for a fibrous material as used in the present invention is denoted that the fibers are not single, but touch each other in order to form at least a two dimensional structure for example in form of a nonwoven or a net or a fabric.

By the term "in-situ polymerization" as used in the present invention is denoted that the final polymerization of the polymeric thermoplastic matrix of the composite material takes place around the fibrous reinforcement material in order to obtain directly the thermoplastic composite material.

With regard to the thermoplastic (metha)acrylic matrix, one could mention thermoplastic polymers as poly alkyl methacrylates or poly alkyl acrylates. The alkyl group or the corresponding alkyl methacrylate or alkyl acrylate monomers consist of C1-C12 alkyl groups.

In a preferred embodiment the thermoplastic (meth) acrylic matrix is poly methyl methacrylate (PMMA).

The term "PMMA" denotes a methyl methacrylate (MMA) homopolymer or a copolymer comprising at least 70%, preferably at least 80%, advantageously at least 90% and more advantageously at least 95% by weight of methyl methacrylate or a mixture of at least one homopolymer and at least one copolymer of MMA, or a mixture of at least two homopolymers or two copolymers of MMA with a different average molecular weight or a mixture of at least two copolymer of MMA with a different monomer composition.

The copolymer of methyl methacrylate (MMA) comprises from 70% to 99.7% by weight of methyl methacrylate and from 0.3 to 30% by weight of at least one monomer having at least one ethylenic unsaturation that can copolymerize with methyl methacrylate. These monomers are well known and mention may be made, in particular, of styrene, alpha-methylstyrene, acrylic and methacrylic acids and alkyl (meth)acrylates in which the alkyl group has from 1 to 12 carbon atoms. As examples, mention may be made of methyl acrylate and ethyl, butyl or 2-ethylhexyl (meth)acrylate. Preferably the comonomer is an alkyl acrylate in which the alkyl group has from 1 to 4 carbon atoms.

In a preferred embodiment the copolymer of methyl methacrylate (MMA) comprises from 80% to 99.7% advantageously from 90% to 99.7% and more advantageously from 90% to 99.5% by weight of methyl methacrylate and from 0.3% to 20% advantageously from 0.3% to 10% and more advantageously from 0.5% to 10% by weight of at least one monomer having at least one ethylenic unsaturation that can copolymerize with methyl methacrylate. Preferably the comonomer is methyl acrylate or ethyl acrylate or mixtures thereof.

The weight average molecular weight of the thermoplastic (metha)acrylic matrix should be high, meaning larger than 50 000 g/mol, preferably larger than 100 000 g/mol.

The weight average molecular weight can be measured by size exclusion chromatography (SEC).

With regard to the reinforcement material, one can mention fibrous material. The fibrous material can have different forms and dimensions either one dimensional, two dimensional or three dimensional.

The one dimensional form is linear long fibers. The fibers may be discontinuous or continuous. The fibers may be arranged randomly or as a continuous filament parallel to each other. A fiber is defined by its aspect ratio, which is the ratio between length and diameter of the fiber. The fibers used in the present invention are long fibers or continuous fibers. The fibers have an aspect ratio of at least 1000, preferably at least 1500, more preferably at least 2000, advantageously at least 3000 and most advantageously at least 5000.

The two dimensional form are fibrous mats or non woven reinforcements or woven roving or bundles of fibers, which can also be braded.

The three dimensional form are for example stacked or folded fibrous mats or non woven reinforcements or bundles of fibers or mixtures thereof, an assembly of the two dimensional form in the third dimension.

The origins of the fibrous material can be a natural or a synthetic one. As natural material one can mention vegetable fibers, wood fibers, animal fibers or mineral fibers.

Natural fibers are for example sisal, jute, hemp, flax, cotton, coconut fibers, and banana fibers. Animal fibers are for example wool or hair.

As synthetic material one can mention polymeric fibers chosen from fibers of thermosetting polymers, from thermoplastic polymers or their mixtures.

The polymeric fibers can be made of polyamide (aliphatic or aromatic), polyester, polyvinylacohol, polyolefins, polyurethanes, polyvinylchloride, polyethylene, unsaturated polyesters, epoxy resins and vinylesters.

The mineral fibers can also be chosen from glass fibers especially of type E, R or S2, carbon fibers, boron fibers or silica fibers. The fibrous material of the present invention is chosen from vegetable fibers, wood fibers, animal fibers, mineral fibers, synthetic polymeric fibers, glass fibers, carbon fibers or mixtures thereof.

With regard to the polymerization method for obtaining the thermoplastic (meth)acrylic matrix, one can mention radical, anionic polymerization or photopolymerization.

The thermoplastic acrylic matrix is not cross linked. By not cross linking is meant that no difunctional or more functional monomer with two or more polymerizable groups in the monomer is used. It is in the scope of the invention that secondary reactions might occur during the polymerization, so that grafting or branching reactions might occur, including some cross linked points in some very few polymer chains. In other words not cross linked is to be understood that no three dimensional network is obtained; that the polymer matrix is not swellable in a good solvent for the respective polymer, but the polymer matrix is still soluble in the solvent.

With regard to the radical initiator, they can be chosen from diacyl peroxides, peroxy esters, dialkyl peroxides, peroxyacetals or azo compounds. The radical initiators which may be suitable are, for example, isopropyl carbonate, benzoyl peroxide, lauroyl peroxide, caproyl peroxide, dicumyl peroxide, tert-butyl perbenzoate, tert-butyl per(2-ethylhexanoate), cumyl hydroperoxide, 1,1-di(tert-butylperoxy)-3,3,5-trimethyl-cyclohexane, tert-butyl peroxyisobutyrate, tert-butyl peracetate, tert-butyl perpivalate, amyl perpivalate, tert-butyl peroctoate, azobisisobutyronitrile (AIBN), azobisisobutyramide, 2,2'-azo-bis(2,4-dimethylvaleronitrile) or 4,4'-azobis(4-cyanopentanoic). It would not be departing from the scope of the invention to use a mixture of radical initiators chosen from the above list. The preferred radical initiator is azobisisobutyronitrile.

The content of radical initiator with respect to the monomers of the mixture which is cast in the mould varies from 100 to 2000 ppm (by weight), preferably between 200 and 1000 ppm, by weight.

Another ingredient can also be a chain-limiting agent in order to control the molecular weight, for example γ-terpinene or terpinolene, at contents of between 0 and 500 ppm and preferably between 0 and 100 ppm, with respect to the monomers of the mixture.

No metal comprising additives as activators for catalytically accelerate the polymerization reaction are added. These concerns especially tin based compounds as tin chloride.

The polymeric composite according to the invention comprises a fibrous material and the polymeric thermoplastic (meth)acrylic matrix. The two are brought into contact by a wetting step of the fibrous material with a liquid syrup comprising the monomers for forming the polymeric thermoplastic (meth)acrylic before the polymerization.

A simple monomer or a monomer mixture is too liquid for the respective methods of preparation of the polymeric composite material of the present invention, especially for the correct and complete wetting and impregnation of the fibrous material. Therefore the viscosity has to be adapted by increasing it.

In one embodiment the viscosity is increased by a prepolymerisation of the monomer. Oligomers are obtained by the prepolymerization.

In another embodiment the viscosity is increased by using monomers or monomer mixtures with dissolved oligomers or polymers. This solution is commonly referred to as "syrup" or "prepolymer". The oligomer or polymer is soluble in the monomer. This oligomer or polymer could be a PMMA or a styrene maleic anhydride copolymer (SMA). Preferably the oligomer or polymer is a methyl methacrylate (MMA) homopolymer or copolymer comprising at least 70%, preferably at least 80%, advantageously at least 90% and more advantageously at least 95% by weight of methyl methacrylate.

The monomer or the monomers in the syrup that will form after polymerization a part of thermoplastic (metha)acrylic matrix present at least 40% by weight, preferably 50% by weight, advantageously 55% by weight and more advantageously 60% by weight of total liquid syrup.

The monomer or the monomers in the syrup that will form after polymerization a part of thermoplastic (metha)acrylic matrix present at most 99% by weight, preferably at most 95% by weight, advantageously at most 90% by weight and more advantageously at most 85% by weight, even more advantageously at most 82% and most advantageously at most 80% by weight of total liquid syrup.

The oligomers or polymers in the syrup that will form also after polymerization a part of thermoplastic (metha)acrylic matrix present at least 1% by weight, preferable at least 5% by weight, advantageously at least 10% by weight, more advantageously at least 15% by weight and even more advantageously at least 18% and most advantageously at least 20% by weight of total syrup.

The oligomers or polymers in the syrup that will form also after polymerization a part of thermoplastic (metha)acrylic matrix present at most 60% by weight, preferable at most 50%, advantageously at most 40% and more advantageously at most 35% by weight of total syrup.

The monomer or the monomers in the syrup that will form after polymerization a part of thermoplastic (metha)acrylic matrix present from 40% to 95% by weight, preferably from 50% to 90% by weight, advantageously from 55% to 85% by weight and more advantageously from 60% to 80% by weight of total liquid syrup. Accordingly the oligomers or polymers in the syrup that will form also after polymerization a part of thermoplastic (metha)acrylic matrix present from 60% to 5% by weight, preferably from 50% to 10% by weight, advantageously from 15% to 45% by weight and more advantageously from 20% to 40% by weight of total liquid syrup.

The dynamic viscosity of the prepolymer or liquid syrup is between 10 mPa*s and 10000 mPa*s, preferably between 50 mPa*s and 5000 mPa*s and advantageously between 100 mPa*s and 1000 mPa*s. The viscosity of the syrup can be easily measured with a Rheometer. The dynamic viscosity is measured at 25° C. The liquid syrup has a Newtonian behaviour, meaning no shear thinning, so that the dynamic viscosity is independent of the shearing in a rheometer or the speed of the mobile in a viscometer.

If the viscosity of the liquid prepolymer or syrup at a given temperature is too high for the correct impregnation, it is possible to heat the syrup in order to have a more liquid syrup within the before mentioned dynamic viscosity interval at the respective temperature during which the impregnation takes place for the sufficient wetting and correct and complete impregnation of the fibrous material.

The liquid syrup according to the present invention does not contain any additional solvent voluntary added.

With regard to the structure or composition of the polymeric composite material of the present invention, it comprises at least 20% by weight of fibrous material, preferable at least 40% by weight of fibrous material advantageously at least 50% by weight of fibrous material and advantageously at least 55% by weight of fibrous material based on the total composition.

The polymeric composite material of the present invention, it comprises at most 99% by weight of fibrous material, preferable at most 95% by weight of fibrous material advantageously at most 90% by weight of fibrous material and advantageously at most 80% by weight of fibrous material based on the total composition.

The structure of the composite concerns also laminates. Several layers or sheets of the thermoplastic fibrous composite material may be bonded together by lamination.

The polymeric composite may comprise also other additives and fillers. All the additives and fillers can be added to the liquid syrup before wetting and polymerization.

As additives one can mention organic additives as impact modifiers or block copolymers, thermal stabilizers, UV stabilizers, lubricants and mixtures thereof.

The impact modifier is in the form of fine particles having an elastomer core and at least one thermoplastic shell, the size of the particles being in general less than 1 μm and advantageously between 50 and 300 nm. The impact modifier is prepared by emulsion polymerization. The impact modifier content in the polymeric thermoplastic matrix is between 0 and 50%, preferably between 0 and 25%, and advantageously between 0 and 20% by weight.

As fillers one can mention carbon nanotubes or mineral charges including mineral nano charges (TiO2, silica).

No metals in the thermoplastic composite material such as tin are present coming from accelerators added for the polymerization step.

The composite does not contain any additional solvent voluntary added, since the syrup did not contain any additional solvent for the impregnation step.

With regard to the method of preparation of the polymeric composite material, several methods could be used in order to prepare three dimensional samples. One can mention lamination, pultrusion, infusion, vacuum bag moulding, pressure bag molding, autoclave molding, resin transfer moulding (RTM), reinforced reaction injection molding (R-RIM) and variants thereof, press molding, filament winding, compression molding or wet lay up.

All methods comprise the steps of wetting the fibrous material with the liquid syrup comprising the monomers for forming the polymeric thermoplastic (meth)acrylic matrix before the polymerization step.

The final molecular weight of the thermoplastic polymeric matrix is obtained during one of the mentioned methods for the preparation of the polymeric composite material.

In the pultrusion method a long continuous product of constant cross section is produced. The fibers coming from creels are wetted and impregnated with the liquid resin in a resin bath followed by preforming, shaping and polymerization.

Resin transfer molding is a method using a two sided mold set which forms both surfaces of composite material. The lower side is a rigid mould. The upper side can be a rigid or flexible mould. Flexible moulds can be made from composite materials, silicone or extruded polymer films such as nylon. The two sides fit together to produce a mould cavity. The distinguishing feature of resin transfer moulding is that the reinforcement materials are placed into this cavity and the mould set is closed prior to the introduction of matrix material. Resin transfer moulding includes numerous varieties which differ in the mechanics of how the resin is introduced to the reinforcement in the mould cavity. These variations include everything from vacuum infusion to vacuum assisted resin transfer moulding (VARTM). This process can be performed at either ambient or elevated temperature. Ambient temperature means between 10° C. and 50° C. Elevated temperature means up to 200° C. Preferably elevated temperature is from 50° C. up to 160° C.

With the infusion method the liquid prepolymer syrup does have to have a viscosity adapted towards the preparation method of the polymeric composite material. The syrup is aspired into the fibrous material present in a special mold by application of a slight vacuum. The fibrous material is infused and completely wetted by the liquid prepolymer syrop.

One advantage of this method is the high amount of fibrous material in the composite.

The preferred methods for preparing the composite materials are methods were the liquid resin of the not yet polymerized matrix material is transferred to the fibrous material more preferably in a mold.

Advantageously the wetting step of the fibrous material is made in a closed mold, by resin transfer molding or by infusion.

More advantageously the wetting step of the fibrous material and the preparation of the thermoplastic composite material take place in the same mold, which is a closed mold. The mold is opaque towards visible and ultraviolet radiation at least on one side.

A closed mold will amongst other things avoid and reduce the evaporation of the monomer and protect the environment.

Still another aspect of the present invention is a manufacturing process for manufacturing mechanical or structured parts or articles comprising the thermoplastic composite material according to the invention comprising following steps:
 a) impregnating a fibrous substrate with a liquid syrup,
 b) polymerising the liquid syrup impregnating said fibrous substrate.

Preferably the impregnation of the fibrous substrate in step a) is made in a closed mold.

Advantageously the step a) and step b) are made in the same closed mould.

The mold is opaque towards visible and ultraviolet radiation at least on one side of the mold.

Using the same closed mold will avoid the transfer of the material after impregnation and polymerizing in a closed mold will guarantee a good distribution of the heat, having a satisfying yield of polymerization and eventually evaporation of the monomer(s).

With regard to the use of polymeric composite material, one can mention automotive applications, nautical applications, railroad applications, sport, aeronautic and aerospace applications, photovoltaic applications and wind energy applications.

The polymeric composite material according to the invention is used to manufacture mechanical or structured parts or articles particularly three-dimensional mechanical or structured parts.

Due to the complete, correct and in a homogenous wetting of the fibrous substrate during impregnation there are no defects of fiber wetting for example by bubbles and voids decrease the mechanical performance of the composite material.

The manufactured mechanical or structured parts or articles comprising polymeric composite material according to the invention do not comprise essentially any pores. By pore is meant a spherical void with a diameter of at least fpm or larger or an elongated ellipsoidal void in form of an oblate with a smallest principal axe of at least 0.5 μm or larger. By "comprising essentially no pores" is meant that the pores represent less then 1 vol %, preferably less then 0.5 vol % and more preferably less then 0.2 vol % of the total volume of the thermoplastic composite material With regard to the use of manufactured mechanical or structured parts or articles, one can mention automotive applications, nautical applications, railroad applications, sport, aeronautic and aerospace applications, photovoltaic applications, computer related applications, telecommunication applications and wind energy applications.

Particularly the three-dimensional mechanical or structured part is a automobile part, boat part, train part, sport article, plane or helicopter part, space ship or rocket part, photovoltaic module part, wind turbine part, furniture part, construction or building part, telephone or cell phone part, computer or television part, printer and photocopy part.

With regard to the recycling of the thermoplastic composite material or manufactured mechanical or structured part or article comprising the thermoplastic composite material it can be made by grinding or depolymerization of the thermoplastic polymer. Grinding is made mechanically in order to obtain smaller parts of pieces. As the structured part compromises thermoplastic polymer, this polymer can be heated, and the pieces again transformed in a certain limit in order to obtain a recycled object.

Preferably the structured part comprising the thermoplastic composite is heated for making a pyrolysis or thermal decomposition of the PMMA and recovering the methyl methacrylate (MMA) as monomer.

Advantageously at least 50 wt % of the MMA present in the polymer are recovered by thermal decomposition.

The structured part is heated at a temperature of at least 200° C. and no more than 400° C.

[Methods]

The weight fraction of the fibres in the composite material is obtained by the norm NF EN 2564 ("Serie aerospatiale—Stratifies de fibres de carbone Determination de la teneur en fibres en resine et du taux de porosite")

The mechanical properties in traction are characterized by following the norm ISO 527-4 ("Plastics—Determination of tensile properties—Part 4: Test conditions for isotropic and orthotropic fibre-reinforced plastic composites") type 3.

The mechanical properties in compression are characterized by following the norm ISO 14126:1999 ("Fibre-reinforced plastic composites—Determination of compressive properties in the in-plane direction") type A1 following a set up of Celanese type.

The mechanical properties in of 3 points bending are characterized by following the norm NF EN 2562 ("Carbon fibre reinforced plastics. Unidirectional laminates. Flexural test parallel to the fibre direction") type 1.

EXAMPLES

FIG. 1 gives a simple scheme of infusion method and the mold (1). The lower part (2) of the mold (1) is made of a rigid and opaque material (2), while the upper part (3) of the mold (1) is made of a flexible material (3) that hermetically closes the mold with help of joints (4) that tightly seal the mold. Between the lower (2) and the upper (3) part of the mold (1) the fibrous material (5) is placed. The liquid resin is distributed with a distribution line (6) that goes inside the mold and a vacuum line (7). By applying a slight vacuum the liquid resin infuses the fibrous material (5) placed between the two parts of the mold (1).

Composite materials are prepared by infusion process. This process consist of drawing in the prepolymer or syrup (liquid resin) through a stack of fabrics (fibrous material) which are placed between a rigid closed mold (rigid opaque glass or metal plate, lower part of the mold) and a flexible plastic film at the outer perimeter or upper part of the mold. For doing this a vacuum is applied between 0.6 bar and 0.95 bar.

The infusion process requires the vacuum only for transferring the syrup through the fabrics.

Example 1 (Invention)

8 folded glass fabrics (glass E plain weave HexForce® 01717 820 TF970 from the company Hexcel with a nominal weight of 160 g/m$^2$) with a dimension of 30 cm×20 cm has been folded at a glass sheet which serves as mould for obtaining a thickness of 2 mm of the composite piece.

A syrup is prepared by dissolving 25 wt % of polymethyl methacrylate (PMMA V825 from Altuglas) in methyl methacrylate (MMA) in presence of 325 ppm AIBN (azo bis isobutyronitrile) and 35 ppm terpinolene (1,4 paramenthadiene). The dissolving takes place at ambient temperature at 25° C. during 48 hours. The viscosity of the syrup solution is 513 mPa*s, measured at ambient temperature (25° C.) with a cone/plate rheometer from the Brookfield company.

The formed prepolymer syrup is infused with the help of a vacuum pump, which allows transferring the syrup through the fabric. The infusion of the sheet happens during 3 minutes, the speed of the infusion front is 100 mm/min. The infused sheet is placed in an oven for 4 hours at 60° C. and an addition heating step of 30 minutes at 125° C. for complete polymerization of the PMMA (reaching a conversion of nearly 100% of the monomer).

The polymeric composite is recovered by separation of the different films of the infusion after the complete polymerization and demoulding.

Example 2 (Invention)

The glass fabric from example 1 is replaced by a fabric of carbon fibres (HexForce® 46285 U 1200 from the company Hexcel).

Example 3 (Comparative Example)

Example 1 is repeated with syrup containing only methyl methacrylate (the 25 wt % PMMA are replace by MMA), AIDN and terpinolene. The viscosity of the syrup is <5 mPa*s. During the impregnation by infusion, the speed of the infusion front is too fast (>500 mm/min) and the syrup could not completely wet and impregnate the glass fabric. After curing in an oven (4 hours at 60° C. followed by 30 minutes at 125° C.), following demolding, the composite is incomplete and has no good mechanical performances. Dry non wetted glass fibers are present in the middle of the composite.

Example 4 (Comparative Example)

8 folded glass fabrics (glass E plain weave HexForce® 01717 820 TF970 form the company Hexcel with a nominal weight of 160 g/m2) with a dimension of 30 cm×20 cm has been folded at a glass sheet which serves as mould for obtaining a thickness of 2 mm of the composite piece.

The fabric is infused with a vinylester resin DION® IMPACT 9102-75 from the company Reichold in which 1.5 wt % NOROX® CHM-50 a peroxide from the company Noerac has been added, in order to initiate the crosslinking of the resin. The viscosity of the resin is 200 mPa*s. The crossslinking reaction of the resin takes place during 24 hours at ambient temperature, followed by a post curing during 2 hours at 65.5° C. and additional 2 hours at 121° C. in an oven.

The polymeric composite is recovered by separation of the different films of the infusion after the complete polymerization and demoulding.

Example 5 (Comparative Example)

The glass fabric from example 4 is replaced by a fabric of carbon fibres (HexForce® 46285 U 1200 from the company Hexcel).

The sheets obtained by examples 1, 2, 4 and 5 are characterized by mechanical properties in traction, compression and flexion. The sheet obtained in example 3 could not be characterized.

TABLE 1

| | | mechanical properties | | | |
|---|---|---|---|---|---|
| | | Example 1 | Example 2 | Example 4 | Example 5 |
| | Class of composite | thermo-plastic | thermo-plastic | thermoset | thermoset |
| | Weight ratio of fibres [%] | 61.4 | 60.8 | 69.0 | 63.4 |
| Traction | Modulus of cord (0.05-0.25% of deformation [GPa] | 16.0 | 55.1 | 20.6 | 48.0 |
| | Tensile stress at break [MPa] | 325 | 723 | 410 | 647 |
| | Deformation at break [%] | 2.38 | 1.34 | 2.53 | 1.33 |
| Compression | Compressive stress at break [MPa] | 112 | 154 | 184 | 239 |
| Flexion | Flexural stress at break [MPa] | 178 | 347 | 239 | 523 |

The comparative examples 4 and 5 with a thermoset crosslinked polyester show, that with the thermoplastic composite according to the present invention it is possible to obtain comparable mechanical properties.

Due to the thermoplastic matrix of examples 1 and 2 the form of the composite can be changed and adapted, for example by welding.

The invention claimed is:

1. A thermoplastic polymeric composite material comprising
(a) a polymeric thermoplastic (meth)acrylic matrix, consisting of at least one acrylic copolymer comprising at least 70% by weight of methyl methacrylate monomer units and from 0.3 to 30% by weight of at least one monomer having at least one ethylenic unsaturation that can copolymerize with methyl methacrylate; and
(b) at least 40 weight percent of a fibrous material, based on the total weight of the polymeric composite material as reinforcement, wherein the fibrous material comprises either a fiber with an aspect ratio of the fiber of at least 1000, or the fibrous material has a two dimensional macroscopic structure,
and wherein said fibrous material and the polymeric thermoplastic (meth)acrylic matrix were brought into contact by a wetting step of the fibrous material with a liquid syrup comprising the monomers for forming the polymeric thermoplastic (meth)acrylic matrix before polymerization, and wherein the dynamic viscosity at 25° C. of the liquid syrup is between 10 mPa*s and 10000 mPa*s in a closed opaque mold.

2. The polymeric composite according to claim 1, wherein the polymeric thermoplastic (meth)acrylic matrix is selected from the group consisting of a mixture of at least one homopolymer and at least one copolymer of MMA, a mixture of at least two homopolymers or two copolymers of MMA having different weight average molecular weights, and mixture of at least two copolymers of MMA with different monomer composition.

3. The polymeric composite according to claim 1, wherein the copolymer of methyl methacrylate (MMA) comprises from 80% to 99.7% by weight of methyl methacrylate and from 0.3% to 20% by weight of at least one monomer having at least one ethylenic unsaturation that can copolymerize with methyl methacrylate.

4. The polymeric composite according to claim 1, wherein the fibrous material is selected from the group consisting of vegetable fibers, wood fibers, animal fibers, mineral fibers, synthetic polymeric fibers, glass fibers, carbon fibers and mixtures thereof.

5. The polymeric composite according to claim 1, wherein the fibrous material is in the form of fibrous mats, a nonwoven, woven roving or bundles of fibers, which can also be braided, or mixtures thereof.

6. A process for preparing the polymeric composite material according to claim 2, comprising the steps of
a) wetting or impregnating a fibrous material with a liquid syrup comprising at least 40% of a monomer or monomers for forming the polymeric thermoplastic (meth)acrylic; and
b) polymerizing said liquid syrup that is wetting or impregnating said fibrous material,
wherein the wetting step of the fibrous material is made in a closed mold.

7. The process for preparing the polymeric composite material according to claim 6, wherein the dynamic viscosity at 25° C. of the liquid syrup is between 10 mPa*s and 10000 mPa*s.

8. The process for preparing the polymeric composite material according to claim 6, wherein the liquid syrup comprises oligomers or polymers dissolved in said monomer or the monomers.

9. The process for preparing the polymeric composite material according to claim 6, wherein the wetting or impregnating step of the fibrous material is made in a closed mold, by resin transfer molding or by infusion.

10. The process for preparing the polymeric composite material according to claim 6, wherein the monomers for forming the polymeric thermoplastic (meth)acrylate are chosen so that the polymeric thermoplastic (meth)acrylate is a copolymer of methyl methacrylate (MMA) comprising from 80% to 99.7% by weight of methyl methacrylate and from 0.3% to 20% by weight of at least one monomer having at least one ethylenic unsaturation that can copolymerize with methyl methacrylate.

11. The process for preparing the polymeric composite material according to claim 8, wherein the dissolved oligomers or polymers are chosen from PMMA or a styrene maleic anhydride copolymer.

12. The process for preparing the polymeric composite material according to claim 8, wherein the dissolved oligomers or polymers is a methyl methacrylate (MMA) homopolymer or copolymer comprising at least 70%, by weight of methyl methacrylate.

13. The process for preparing the polymeric composite material according to claim 6, wherein the monomer or the monomers of the liquid syrup are present at 50% or greater by weight.

14. The manufacturing process according to claim 13 wherein the impregnation of the fibrous substrate in step a) is made in a closed mold and the step a) and step b) are made in the same closed mold.

15. The polymeric composite material of claim 1, wherein said composite material is a manufactured mechanical or structured part or article.

16. The polymeric composite material of claim 15, wherein said manufactured mechanical or structured part or article consists essentially of no pores.

17. The polymeric composite material of claim 15, wherein said manufactured mechanical or structured part or article is a part or article for use in automotive applications, marine applications, railroad applications, sport, aeronautic and aerospace applications, photovoltaic applications or wind energy applications.

18. The polymeric composite material of claim 15, wherein said
  manufactured mechanical or structured part or article is a part selected from a automobile part, boat part, train part, sport article, plane or helicopter part, space ship or rocket part, photovoltaic module part, wind turbine part, furniture part, construction or building part, telephone or cell phone part, computer or television part, and printer or photocopy part.

19. The polymeric composite material of claim 1, wherein said liquid syrup does not contain any additional voluntary added solvent.

20. The polymeric composite material of claim 1, wherein said liquid syrup does not contain any metal additives as activators for catalytically accelerating the polymerization reaction.

21. The polymeric composite material of claim 20, wherein said metal additives not in said liquid syrup are tin-based compounds.

* * * * *